(12) United States Patent
Seki (10) Patent No.: US 8,323,450 B2
(45) Date of Patent: Dec. 4, 2012

(54) METHOD OF MANUFACTURING HEAT STORAGE MATERIAL, HEAT STORAGE MATERIAL, AND HEAT STORAGE ADSORBENT MATERIAL AND CANISTER

(75) Inventor: Kenji Seki, Higashiosaka (JP)

(73) Assignee: Osaka Gas Chemicals Co., Ltd., Osaka (JP)

( * ) Notice: Subject to any disclaimer, the term of this patent is extended or adjusted under 35 U.S.C. 154(b) by 765 days.

(21) Appl. No.: 12/516,223

(22) PCT Filed: Apr. 22, 2009

(86) PCT No.: PCT/JP2009/057993
§ 371 (c)(1),
(2), (4) Date: Aug. 19, 2009

(87) PCT Pub. No.: WO2009/145020
PCT Pub. Date: Dec. 3, 2009

(65) Prior Publication Data
US 2011/0036537 A1    Feb. 17, 2011

(30) Foreign Application Priority Data

May 27, 2008    (JP) .................................. 2008-138542

(51) Int. Cl.
*B01D 53/02* (2006.01)
*B01J 20/28* (2006.01)
*C09J 161/10* (2006.01)
*C09K 5/06* (2006.01)
*F02M 33/02* (2006.01)
*B32B 3/26* (2006.01)

(52) U.S. Cl. .......... 156/335; 96/146; 123/519; 156/330; 156/330.9; 156/331.3; 156/334; 156/336; 428/321.5

(58) Field of Classification Search .................. None
See application file for complete search history.

(56) References Cited

U.S. PATENT DOCUMENTS

| 7,543,574 B2 * | 6/2009 | Yamazaki et al. ............. 123/519 |
| 2005/0247202 A1 * | 11/2005 | Seki ................................ 96/146 |
| 2007/0248824 A1 * | 10/2007 | Lang-Wittkowski et al. ..................... 428/402.24 |
| 2007/0277788 A1 * | 12/2007 | Egawa et al. .................. 123/519 |
| 2008/0184973 A1 | 8/2008 | Yamazaki et al. |

FOREIGN PATENT DOCUMENTS

| JP | 2006-68693 A | * | 3/2006 |
| JP | 2006063328 A | | 3/2006 |
| JP | 2006068693 A | | 3/2006 |
| JP | 2008069680 A | | 3/2008 |
| JP | 2008106164 A | | 5/2008 |
| JP | 2008-221046 A | * | 9/2008 |
| WO | 2007135978 A1 | | 11/2007 |

* cited by examiner

*Primary Examiner* — Robert Sellers
(74) *Attorney, Agent, or Firm* — The Webb Law Firm (57) ABSTRACT

The invention relates to a method of manufacturing a heat storage material that contains heat storage capsules. The heat storage capsules include a phase change material that absorbs and/or discharges latent heat in response to a change in temperature. The phase change material resides within outer shells of the heat storage capsules. The method involves binding abutting peripheral portions of a plurality of heat storage capsules with a molding binder, so as to form an intermediate granular molded heat storage material. An outer peripheral surface portion of the granular molded heat storage material is coated with a coating binder. The coated granular molded heat storage material is then subjected to a treatment that causes the coating binder of the coating layer to polymerize. The invention also relates to heat storage adsorbent materials, and articles (e.g., canisters) that include such heat storage adsorbent materials.

17 Claims, 4 Drawing Sheets

Fig.1 manufacturing of heat storage capsules

Fig.2 manufacturing of molded heat storage material

METHOD OF MANUFACTURING HEAT STORAGE MATERIAL, HEAT STORAGE MATERIAL, AND HEAT STORAGE ADSORBENT MATERIAL AND CANISTER

FIELD OF THE INVENTION

The present invention relates to a method of manufacturing heat storage material containing heat storage capsules comprising a phase change material absorbing/discharging latent heat in accordance with change in temperature, the phase change material being charged in outer shells. The invention relates also to the heat storage material manufactured by this method, a heat storage adsorbent material having heat storing function and comprising mixture of the heat storage material and an adsorbent material, as well as a canister charged with such heat storage adsorbent material.

BACKGROUND OF THE INVENTION

As is known, with a heat storage adsorbent material prepared by mixing a heat storage material containing heat storage capsules (referred to as "microcapsules" hereinafter) comprising a phase change material absorbing/discharging latent heat in accordance with change in temperature, the phase change material being charged in outer shells and an adsorbent material, when temperature change occurs in repetition as the adsorbent material adsorbs an adsorption target substance to generate heat or desorbs the target substance to absorb heat, the temperature change is minimized by the heat storing function of the heat storage material, thus preventing reduction in the adsorbing/desorbing performance of the adsorbent material.

There is known an adsorbent canister using such heat storage adsorbent material charged in a case, the canister being provided for e.g. preventing evaporable fuel (organic solvent) such as gasoline supplied to an internal combustion engine of an automobile or the like from being discharged to the outside (e.g. into the atmosphere). With this adsorbent canister in operation, e.g. when the vehicle is stopped, excess evaporable fuel is adsorbed to the adsorbent material within the canister and when e.g. the vehicle runs, ambient air is introduced as a "purge gas" into the case to desorb the evaporable fuel, so that this fuel is recycled to the internal combustion engine for instance. Therefore, with the heat storage material comprising heat storage adsorbent material charged within a case, there is the risk of the phase change material contained in the case leaking to the outside of the outer shell as a result of the evaporable fuel if the adsorption target substance destroys or permeates the outer shell of the heat storage capsule. The breakage or damage of the outer shell and the resultant leakage of the phase change material contained therein to the outside can occur also, due to degradation of the outer shell of the heat storage capsule by moisture or water content present within this case. Such leakage of phase change material to the outside can lead to deterioration in the heat storing function and reduction in the adsorption/desorption performance.

In order to solve the above problem, according to a technique disclosed in Japanese Patent Application "Kokai" No. 2008-069680 (JP '680), the outer shell of the heat storage capsule charged with a phase change material is comprised of an inner layer made of a hydrophobic resin and an outer layer made of a hydrophilic resin. Further, these heat storage capsules are formed into a molded heat storage material with a binder of e.g. thermosetting type resin and then this molded heat storage material is mixed with a molded adsorbent material formed separately, thus forming a heat storage adsorbent material. And this resultant heat storage adsorbent material is charged in a canister for use.

With this heat storage adsorbent material, the heat storage capsule employs an outer shell having the two-layered construction consisting of the inner layer and the outer layer. Therefore, even when an evaporable fuel such as an ethanol mixed gasoline (ethanol 10%, gasoline 90%) is used, it is possible to effectively restrict or avoid permeation of this evaporable fuel through the outer shell of the heat storage capsule, so that the adsorption/desorption performance can be maintained favorably for an extended period of time. Further, since the heat storage capsules are formed into the molded heat storage material (corresponding to "molded heat storage material" of the present invention) with using a binder (corresponding to "molding binder" of the present invention) in advance and then mixed with a separately molded adsorbent material, it is possible to minimize destruction of the heat storage capsules having a relatively low strength in the course of mixing with this molded adsorbent material, thus preventing reduction in the heat storing function. As a result, it is said that deterioration in the adsorption/desorption performance of the heat storage adsorbent material can be prevented.

However, with the heat storage capsules of the molded heat storage material constituting the heat storage adsorbent material disclosed in JP '680, the outer layer of the outer shell is made of a hydrophilic resin. So, there is the risk of this capsule being dissolved by moisture or the like. Further, as it is difficult for this resin to completely cover the inner layer constituting the outer shell, with contact with the evaporable fuel, there occurs progressive destruction of the outer shell of the heat storage capsule (especially, its outer layer), whereby the phase change material contained therein may leak to the outside.

Figure 8:
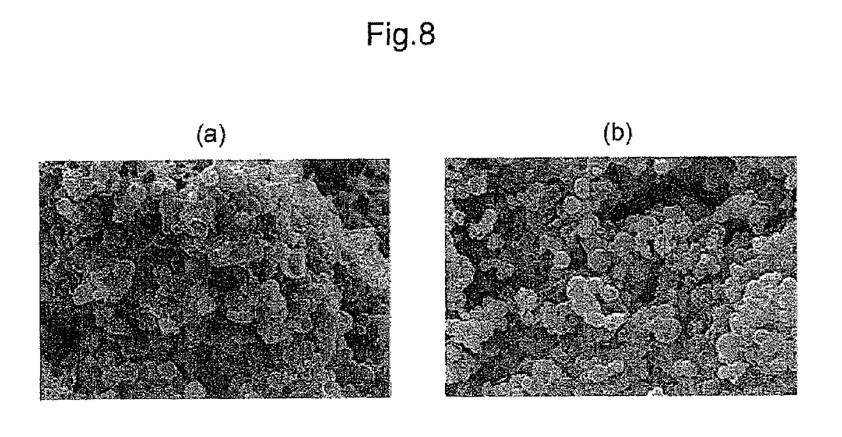

Further, for example, in JP '680, the heat storage capsules are formed with the binder into the molded heat storage material. This forming is done with mixing a relatively small amount of binder (e.g. 5 weight parts of binder relative to 95 weight parts of heat storage capsules). The larger the amount of binder, the higher the ratio of this binder having no heat storing ability, hence, the lower the heat storing performance per unit volume. This is the probable reason why the amount of binder is kept small. In this respect, with such molded heat storage material molded with mixing of a relatively small amount of binder, as shown in SEM (scanning electron microscope) photos in FIGS. 8 (a) and (b), it may be understood that on its surface and the inner side, the periphery of mutually contacting portions of the plurality of substantially spherical heat storage capsules is bound with the binder. Therefore, although the material is molded with the binder, gaps or voids are formed in the other portions on the surface and the inner side of the molded heat storage material than those where the heat storage capsules are present. With the presence of such gaps or voids in the surface and the inner side, if the capsules are exposed to an evaporable fuel such as gasoline, in particular, a mixture of alcohol and gasoline which is highly aggressive or disintegrative to the heat storage capsules, this mixture will readily soak into the molded heat storage material, thus tending to invite progressive destruction of the outer shells of the heat storage capsules. As a result, the phase change material contained therein may leak to the outside.

And, such leakage of the phase change material leads to deterioration in the heat storing performance and deterioration in the adsorption/desorption performance.

SUMMARY OF THE INVENTION

The present invention has been made in view of the above-described drawback. The object of the invention is to provide a technique for a heat storage material containing heat storage capsules, the technique allowing maintaining favorable adsorption/desorption performance through effective restriction of deterioration in the heat storing performance even under a condition where an organic solvent (in particular, an evaporable fuel such as a mixture of alcohol and gasoline) is present or a condition where moisture or water is present.

For accomplishing the above object, according to the present invention, there is proposed a method of manufacturing a heat storage material containing heat storage capsules comprising a phase change material absorbing/discharging latent heat in accordance with change in temperature, the phase change material being charged in outer shells of the heat storage capsules, the method comprising the steps of:

binding a periphery of mutually contacting portions of a plurality of heat storage capsules with a molding binder, thereby to mold a granular molded heat storage material;

coating an outer peripheral surface portion of the molded heat storage material with a coating binder to form a coating layer thereon; and subjecting the coated molded heat storage material having the coating layer to a reaction promoting treatment for promoting a polymerization reaction of at least the coating binder in the coating layer.

BRIEF DESCRIPTION OF THE DRAWINGS

FIG. 7(a) is an SEM photograph (×30) showing a section of a coated molded heat storage material after a heating treatment relating to Example 1; (b) is an SEM photograph (×1000) showing a section of the coated molded heat storage material after the heating treatment relating to Example 1; (c) is an SEM photograph (×30) showing a surface of a coated molded heat storage material after a heating treatment relating to Example 1; (d) is an SEM photograph (×1000) showing a surface of the coated molded heat storage material after the heating treatment relating to Example 1; and FIG. 8(a) is an SEM photograph (×1000) of inside of a molded heat storage material relating to Comparison Example 1; (b) is an SEM photograph (×1000) of a section of a molded heat storage material relating to Comparison Example 1.

DETAILED DESCRIPTION OF THE INVENTION

With the above characterizing feature, after the molded heat storage material containing the heat storage capsules is molded with the molding binder, the outer peripheral surface portion of this molded heat storage material is coated with a coating binder to form a coating layer thereon. Therefore, even if organic solvent or moisture comes into contact with this molded heat storage material, the coating layer prevents such organic solvent or moisture from entering the inside of the coated molded heat storage material, thus preventing breakage or damage of the outer shells of the heat storage capsules contained in the coated molded heat storage material. In particular, as the reaction promoting treatment has been conducted for promoting polymerization reaction of the coating binder constituting this coating layer, this coating layer is formed in high density, so that this coating layer can prevent intrusion of organic solvent or moisture in an even more reliable manner.

More particularly, the heat storage material is formed into the molded heat storage material in the granular form by binding the periphery of the mutually contacting portions of the plurality of heat storage capsules with the molding binder. With this molded heat storage material, as the periphery of the mutually contacting portions of the plurality of heat storage capsules is bound with the molding binder, in the surface and inside thereof gaps or voids are present (see, e.g. FIG. 2, FIGS. 8(a) and (b)). As the molding is done in this way, it is possible to reduce the mixing amount of the molding binder not having any heat storing ability, thereby to avoid disadvantageous reduction in the heat storing amount per unit volume.

Subsequently, the outer peripheral surface portion of this molded heat storage material is coated with a coating binder to form a coating layer thereon. This coating layer is formed in such a manner as to cover the outer peripheral surface portion entirely, with leaving the gaps or voids in the surface and the inside of the molded heat storage material (see, e.g. FIG. 3). Therefore, with the molded heat storage material before formation of the coating layer thereon, organic solvent or moisture may enter the gaps or voids present in its surface and the inside, thus, there exists the risk of progressive disintegration of the outer shells. But, with the coated molded heat storage material after the formation of the coating layer thereon, since the entire outer peripheral surface portion thereof is coated with the coating layer, intrusion of organic solvent or moisture to the inside of the coated molded heat storage material is effectively prevented (soaking resistance), whereby the breakage or disintegration of the outer shells of the heat storage capsules can be avoided. Incidentally, as the coating layer is formed with leaving the gaps or voids in the surface and inside of the molded heat storage material, it is possible to coat the entire outer peripheral surface portion in a reliable manlier even with a relatively small amount of the coating binder.

Furthermore, this coated molded heat storage material is subjected to a reaction promoting treatment for promoting polymerization reaction (e.g. a heating treatment or an acid treatment). With this, even when the polymerization degree of the coating layer is low, for instance, the polymerization reaction of at least the coating binder forming the coating layer is promoted, whereby small holes present in the coating layer may be closed, thereby to allow formation of a coating layer in a higher density (see, e.g. FIGS. 7(a), (b), (c), (d)). Such dense coating layer has a high mechanical strength and also achieves high soaking resistance against organic solvents, especially, gasoline with a high mixing amount of alcohol highly aggressive to the coating binder, etc., so that the destruction of the outer shells of the heat storage capsules can be effectively prevented. Incidentally, the reaction promoting treatment promotes not only the polymerization reaction of the coating binder, but promotes also polymerization reactions of the molding binder and a polymer material constituting the outer shells of the heat storage capsules, so that these materials too can be formed in higher densities respectively.

Therefore, even under such condition where an organic solvent (in particular, evaporable fuel comprising mixture of alcohol and gasoline) or moisture or water is present, there will occur no reduction in the heat storing performance, and the favorable adsorption/desorption performance can be ensured.

According to a further characterizing feature of the method of manufacturing a heat storage material relating to the present invention, in forming the molded heat storage material, mixture of a solution of the molding binder dissolved in a solvent and the plurality of heat storage capsules is dried to obtain the molded heat storage material.

With this characterizing feature, the molded heat storage material is obtained by drying mixture of a solution of the molding binder dissolved in a solvent and the plurality of heat storage capsules. Therefore, after the outer contour of the molded heat storage material comprising the plurality of heat storage capsules has been formed reliably with using the molding binder, the coating layer can be formed on the outer peripheral surface of this molded heat storage material.

As a result, even when the coating layer is formed in such a manner as to completely cover the outer peripheral surface portion of the molded heat storage material, the amount of coating binder can be relatively small. In addition, the coating operation can be carried out relatively easily.

According to a still further characterizing feature of the method of manufacturing a heat storage material relating to the present invention, said molded heat storage material is formed with mixing 1 to 10 mass % of said molding binder for the plurality of heat storage capsules.

With this characterizing feature, the molded heat storage material is molded with mixing a relatively small amount of molding binder relative to the plurality of heat storage capsules.

With this, the molding is made possible with binding only the periphery of the contacting portions of the plurality of heat storage capsules with the molding binder. As a result, it becomes possible to minimize the mixing amount of the molding binder not having any heat storing ability. As a result, it becomes possible to prevent more effectively reduction in the heat storing capacity per unit volume. That is, if the mixing amount of the molding binder for the plurality of heat storage capsules is less than 1 mass %, this will result in deterioration in the strength of the molded heat storage material. So, this molded heat storage material can be destructed and there occurs reduction in the heat storing effect. Further, in the molded heat storage material, more than necessary number of gaps or voids will be formed between the heat storage capsules bound with the molding binder, thus resulting in reduction in the density, which results, in turn, in reduction in the heat storing performance per unit volume disadvantageously. On the other hand, if the mixing amount exceeds 10 mass %, this will result in reduction in the amount of heat storage capsules relative to the amount of molding binder, which also results in reduction in the heat storing capacity disadvantageously. For the same reason, preferably, the mixing amount is from 1-8 mass %, more preferably from 2-6 mass %.

According to a still further characterizing feature of the method of manufacturing a heat storage material relating to the present invention, said coating layer is formed with using 1-10 mass % of the coating binder relative to the molded heat storage material.

With this characterizing feature, the coating layer is formed with using a relatively small amount of coating binder relative to the molded heat storage material.

As a result, the amount of the coating binder having no heat storing ability can be minimized while reliably coating the outer peripheral surface portion of the molded heat storage material, whereby disadvantageous reduction in the heat storing capacity per unit volume can be avoided. More particularly, if the addition amount of the coating binder relative to the molded heat storage material is less than 1 mass %, this will result in disadvantageous reduction in the resistance against alcohol as well as resistance against gasoline. Whereas, if the amount exceeds 10 mass %, this results in reduction in the amount of the heat storage capsules relative to the molding binder and the coating binder, which results, in turn, in disadvantageous reduction in the heat storing capacity. For the same reason, preferably, the addition amount is from 1-8 mass %, more preferably from 2-6 mass %.

According to a still further characterizing feature of the method of manufacturing a heat storage material relating to the present invention, said reaction promoting treatment is a heating treatment for heating the coated molded heat storage material.

With this characterizing feature, as a heating treatment for heating the coated molded heat storage material is effected as the reaction promoting treatment, the polymerization reaction of at least the coating binder constituting the coating layer is promoted to increase the polymerization degree of this coating binder (decrease the holes), thus rendering this coating layer denser. With this, the mechanical strength of the coating layer is improved and also the layer can achieve higher soaking resistance against an organic solvent, in particular, gasoline with a high mixing ratio of alcohol highly aggressive for the coating binder, etc., whereby destruction of the outer shells of the heat storage capsules can be prevented effectively.

According to a still further characterizing feature of the method of manufacturing a heat storage material relating to the present invention, said heating treatment uses a heating temperature range from 140° C. that is a temperature for promoting a polymerization reaction of at least the coating binder in the coating layer and to 185° C. that is a temperature not destroying the heat storage capsules by heating.

With the above characterizing feature, the polymerization degree of the coating binder in the coating layer can be raised sufficiently so as not to leave any unhardened portions therein and the heating can be clone to such a degree not to cause bulging of the phase change material charged in the heat storage capsules thereby to destroy the outer shells thereof, so that a coating layer with a higher density can be formed and this coating layer can even more effectively prevent intrusion of organic solvent. Incidentally, the temperature used in drying with heating in the course of forming the molded heat storage material is about 90° C. generally. So, under this condition, there may remain a portion where the polymerization reaction of the coating binder has not progressed sufficiently (hardened portion). However, with heating in the above-shown temperature range, the polymerization reaction can be promoted favorably, thus minimizing formation of such unhardened portions.

The reason why the heating temperature should be 140° C. or higher is to sufficiently promote further polymerization reaction of the coating binder to eliminate any unhardened portion therein. On the other hand, the reason why the heating temperature should be 185° C. or lower is to restrict thermal decomposition of the heat storage capsules due to bulging of the phase change material charged in the capsules, which would result in increase in rise in the inner pressure and in eventual breakage of the outer shells. For the same reason, preferably, the heating temperature should range from 150° C. to 180° C.

According to a still further characterizing feature of the method of manufacturing a heat storage material relating to the present invention, said reaction promoting treatment comprises an acid treatment on the coated molded heat storage material.

With this characterizing feature, in the reaction promoting treatment, as acid treatment is effected on the coated molded heat storage material. Hence, the polymerization reaction of at least the coating binder constituting the coating layer is promoted to increase the polymerization degree of this coating binder (decrease the holes), thus rendering this coating layer denser. In particular, if an acid treatment is done as the reaction promoting treatment during the heating treatment, this results in shifting of the above-shown temperature range (e.g. from 140° C. to 185° C.) suitable for the heating treatment to the lower temperature side by a predetermined width, so that the densification of the coating layer can be carried out at a lower temperature.

According to a still further characterizing feature of the method of manufacturing a heat storage material relating to the present invention, said molding binder and said coating binder each comprises a thermoset resin.

With this characterizing feature, as both the molding binder and the coating binder comprise a thermoset resin having a property of being hardened when heated, in the course of molding by binding the plurality of heat storage capsules together and also in the course of forming the coating layer, the polymerization reaction can be promoted by the relatively simple treatment of heating for hardening the resin, thus ensuring sufficient strengths.

According to a still further characterizing feature of the method of manufacturing a heat storage material relating to the present invention, said molding binder and said coating binder each comprises a resin having a group reactive with an un-reacted group of a polymer compound constituting the outer shell.

With this characterizing feature, with using the resin having group reactive with an un-reacted group of a polymer compound constituting the outer shell of the heat storage capsule, the plurality of heat storage capsules are bound together to form the molded heat storage material and then this molded heat storage material is coated. Hence, through the contact between this resin and the polymer compound constituting the outer shell, the polymerization reaction is promoted, so that the polymerization degree of this polymer compound is increased, whereby the strength of the outer shell of the heat storage capsule can be improved. Incidentally, at the step of capsulation (in general, the heating temperature ranges from 70° C. to 80° C.), the polymer compound constituting the outer shell of the heat storage capsule contains a significant number of un-reacted groups with un-progressed polymerization reaction. Therefore, the above-described arrangement of enhancing the polymerization degree by the group reactive with the un-reacted groups is effective.

According to a still further characterizing feature of the method of manufacturing a heat storage material relating to the present invention, said molding binder and said coating binder each comprises a resin which has both a hydrophobic group and a hydrophilic group.

With this characterizing feature, as the molding binder and the coating binder each comprises a resin which has a hydrophilic group before hardening and has a hydrophobic group after hardening, the molded heat storage material and the coating layer formed with hardening of these resins have water resistance. So, breakage of the heat storage capsules by moisture can be prevented.

According to a still further characterizing feature of the method of manufacturing a heat storage material relating to the present invention, prior to the formation of the coating layer, a hydrophilic resin is coated on the surface of the molded heat storage material to form an intermediate layer thereon, or in the course of the formation of the coating layer, a hydrophilic resin is added to said coating binder to form said coating layer.

With the above characterizing feature, an intermediate layer made of a hydrophilic resin is formed between the molded heat storage material and the coating layer, or a hydrophilic resin is added to the coating layer. As a result, even when it is difficult for the coating binder (e.g. containing water) to be firmly attached to the outer peripheral surface portion of the molded heat storage material due to the hydrophobicity of the molding binder after its hardening, the presence of the above hydrophilic resin makes it relatively easy for the coating binder to be firmly attached to this outer peripheral surface portion. As a non-limiting example of such resin having hydrophilicity, polyvinyl alcohol, etc. can be cited.

According to a still further characterizing feature of the method of manufacturing a heat storage material relating to the present invention, after the formation of the coating layer, an outer peripheral surface portion of the coating layer in the coated molded heat storage material prior to the reaction promoting treatment, is coated with an overcoating resin having a lower hardening temperature than the hardening temperature of the coating binder forming the coating layer, thereby to form an overcoating layer thereon.

According to the above characterizing feature, after the formation of the coating layer, an outer peripheral surface portion of the coating layer in the coated molded heat storage material prior to the reaction promoting treatment, is coated with an overcoating resin having a lower hardening temperature than the hardening temperature of the coating binder forming the coating layer, thereby to form an overcoating layer thereon. With this, even when a relatively high temperature is provided as a heating treatment is effected in the reaction promoting treatment for promoting the polymerization of the coating binder (which leads to promotion of hardening), the overcoating resin of the overcoating layer formed on the outside of the coating layer is hardened before the coating binder forming the coating layer is hardened. As a result, it is possible to prevent mutual adherence between the coated molded heat storage materials in the heating process prior to the heating treatment or in the course of the heating treatment. In this respect, the relationship between the hardening temperature of the overcoating resin and the hardening temperature of the coating binder should be such that at the initial stage of heating treatment, the hardening of the overcoating resin should be substantially completed prior to the hardening of the coating binder. This is the requirement for the relationship between the hardening temperatures. Incidentally, the hardening temperature is such a temperature at which in the coating binder resin or the overcoating resin, its moisture content as the solvent evaporates and a resin layer having a certain high polymerization degree is formed as a result.

According to a still further characterizing feature of the method of manufacturing a heat storage material relating to the present invention, said coating binder comprises a phenol resin and said overcoating resin comprises a resin which is hardened at a temperature of 100° C. or lower.

With the above characterizing feature, as the coating binder comprises a phenol resin and the overcoating resin comprises a resin which is hardened at a temperature of 100° C. or lower, it is possible to cause the overcoating resin to be hardened before the phenol resin is hardened (its hardening temperature is about 150° C. for example). Hence, it is possible to prevent more effectively mutual adherence between the coated molded heat storage materials in the heating process prior to the heating treatment or in the course of the heating treatment.

According to a still further characterizing feature of the method of manufacturing a heat storage material relating to the present invention, said overcoating resin comprises a polyacrylic resin.

With the above characterizing feature, as the overcoating resin for forming the overcoating layer, a preferred substance can be specifically selected. And, the mutual adherence between the coated molded heat storage materials can be avoided even more reliably.

For accomplishing the above-noted object, according to the present invention, there is also provided a heat storage material, wherein the heat storage material is manufactured by the above-described method of manufacturing a heat storage material and at least one of the molding binder and the coating binder comprises a phenol resin or an epoxy resin and has resistance against alcohol.

With the above-described characterizing feature, in the heat storage material manufactured by the inventive method above, at least one of the molding binder and the coating binder comprises a phenol resin or an epoxy resin. So, the heat storage material has a high soaking resistance against alcohol which generally is highly aggressive to the binder. Therefore, the heat storage material can be used for a long period of time even in a situation where at least alcohol (e.g. ethanol) is present.

For accomplishing the above-noted object, according to the present invention, there is further proposed a heat storage adsorbent material, wherein the material comprises a mixture of the inventive heat storage material and an adsorbent material.

With the above characterizing feature, even when the adsorbent material adsorbs/desorbs the adsorption target material to cause a temperature change thereby to invite deterioration in the adsorption/desorption performance, this temperature change is absorbed/discharged as a latent heat by the heat storage material, so that temperature change in the adsorbent material can be restricted, whereby deterioration in the adsorption/desorption performance of this adsorbent material can be avoided.

For accomplishing the above-noted object, according to the present invention, there is further proposed a canister, wherein the heat storage adsorbent material having the above-described characterizing feature of the heat storage adsorbent material is contained in a case of the canister.

With this characterizing feature, as the heat storage adsorbent material containing the coated molded heat storage material with the enhanced mechanical strength and enhanced soaking resistance is contained in the case of the canister, it is possible to prevent evaporable fuel such as alcohol-containing gasoline adsorbed in the adsorbent material in the case from entering the coated molded heat storage material to destroy or permeate the outer shells of the heat storage capsules, thereby to invite leakage of the phase change material charged in the outer shells to the outside. It is also possible to reliably prevent moisture or water present inside the case from degrading the outer shells of the heat storage capsules to destroy the outer shells, thereby to invite leakage of the phase change material charged in the outer shells to the outside.

With the above, the adsorption/desorption performance can be maintained high and the processing amount of the evaporable fuel in the canister can be increased. It is also possible to prevent the phase change material and/or the polymer compound from entering the internal combustion engine to cause a trouble therein.

An embodiment of a method of manufacturing a heat storage material relating to the present invention (referred to as the "inventive method" hereinafter) will be described with reference to the accompanying drawings.

As shown in FIGS. 1 through 5, the inventive method is a method of manufacturing a heat storage material 5 comprising heat storage capsules 3 formed by charging a phase change material 1 within an outer shell made of a polymer compound 2. The phase change material 1 absorbs/discharges latent heat in response to a change in temperature. This method can be divided roughly into the steps of manufacturing of the heat storage capsules 3 (a plurality of heat storage capsules 3b in the form of powder), manufacturing of a molded heat storage material 5a, manufacturing of a coated molded heat storage material 5b, and a reaction promoting treatment.

More particularly, according to the inventive method, the periphery of mutually contacting portions between the plurality of heat storage capsules 3 is bound together with a molding binder 4 to be formed into a granular molded heat storage material 5a. Thereafter, an outer peripheral surface portion of this molded heat storage material 5a is coated with a coating binder 6 to form a coating layer 7 thereon. Then, this coated molded heat storage material 5b having the coating layer 7 thereon is subjected to a reaction promoting treatment for promoting a polymerization reaction of at is least the coating binder 6 in the coating layer 7, thereby to complete the inventive heat storage material. In the above, the language "the periphery of mutually contacting portions" means the periphery of the portions of adjacent heat storage capsules 3 in contact with each other. In the dried condition, the other portion of the material than these portions are formed as gaps or voids V.

Figure 6:
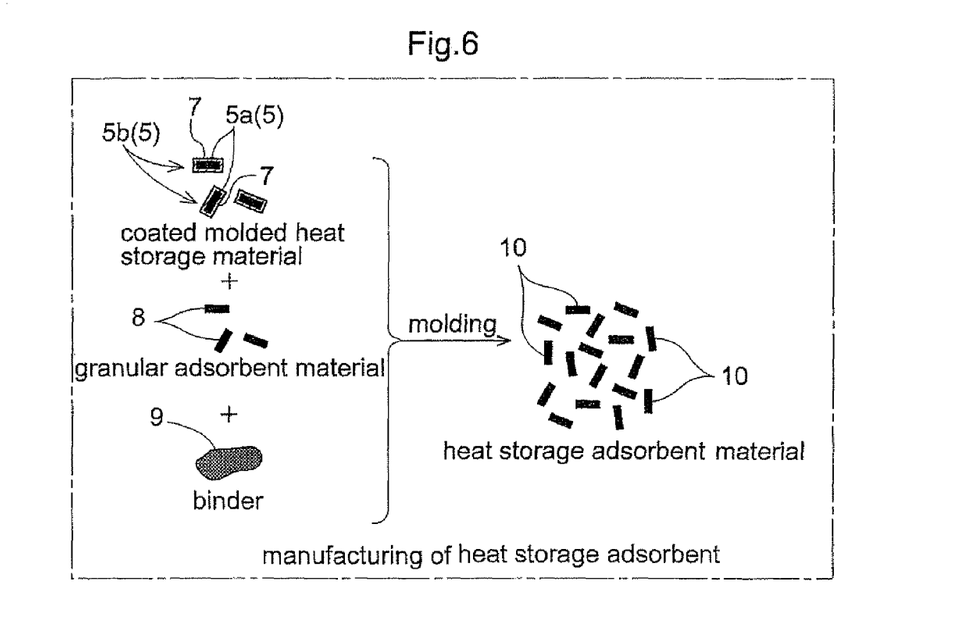
FIG. 6 is a schematic view illustrating a process of molding a heat storage adsorbent material comprising mixture of a heat storage material and an adsorbent material.

Further, as shown in FIG. 6, the coated molded heat storage material 5b (heat storage material 5) manufactured by the inventive method is mixed with an adsorbent material 8 to be made into a heat storage adsorbent material 10. Alternatively, though not shown, a heat storage adsorbent material 10 can be manufactured by simply mixing the coated molded heat storage material 5b with the adsorbent material 8.

Figure 1:
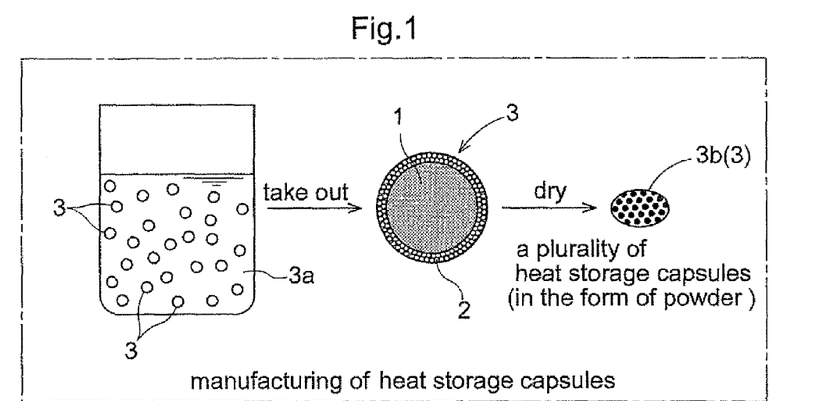
FIG. 1 is a schematic view showing a process of manufacturing heat storage capsules in the form of powder by the inventive method.
Figure 2:
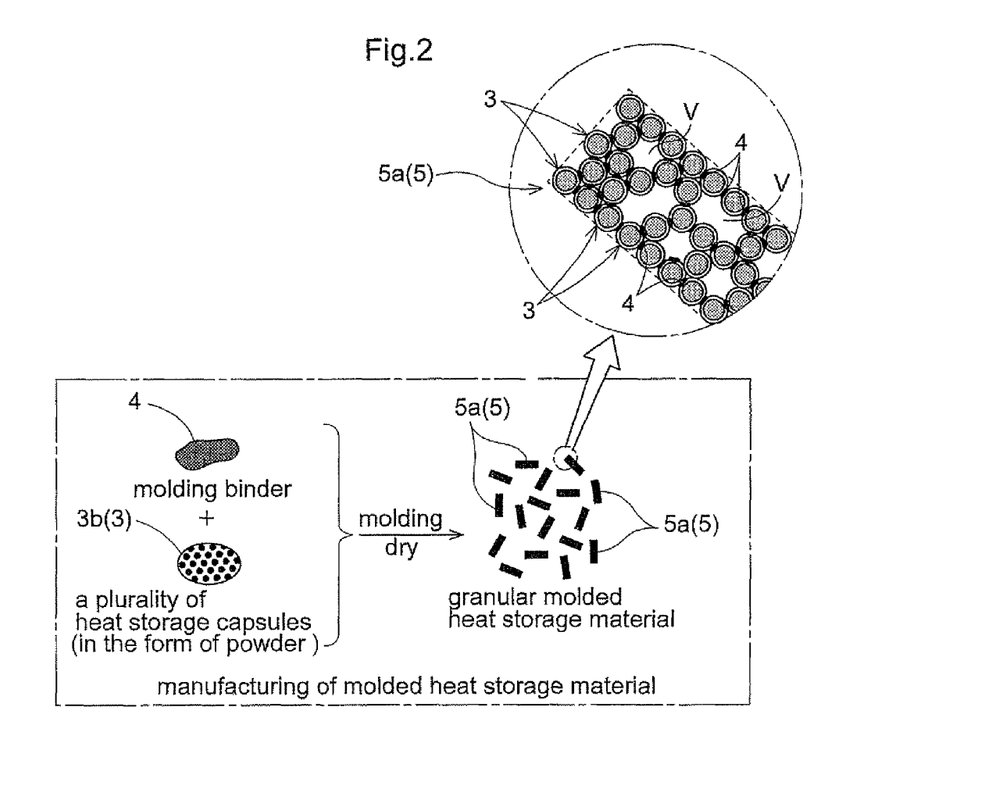
FIG. 2 is a schematic view illustrating a molding process of a molded heat storage material by the inventive method.
Figure 3:
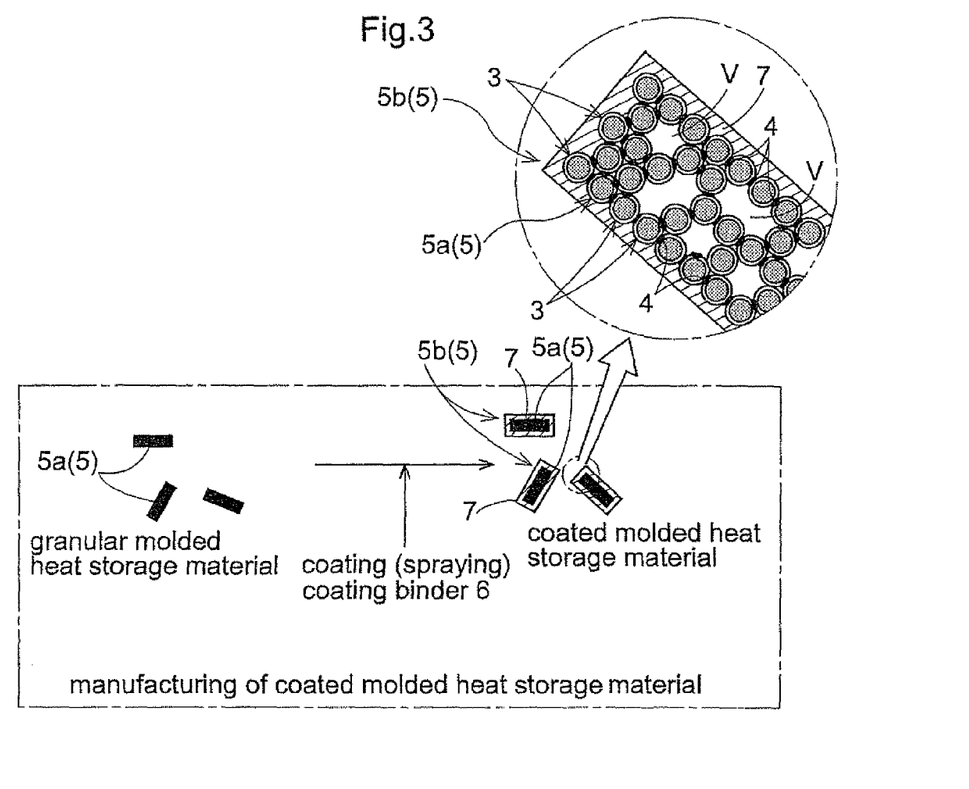
FIG. 3 is a schematic view illustrating a process of forming a coating layer in the inventive method.
Figure 4:
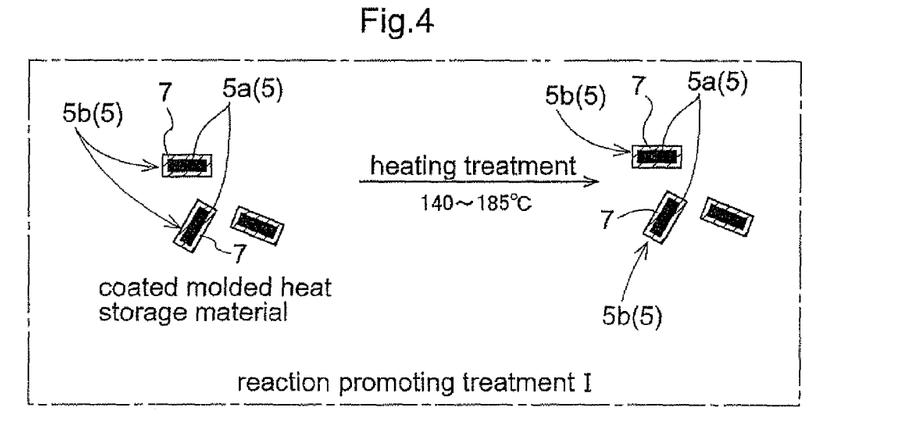
FIG. 4 is a schematic view illustrating a process of a heating treatment in the inventive method.
Figure 5:
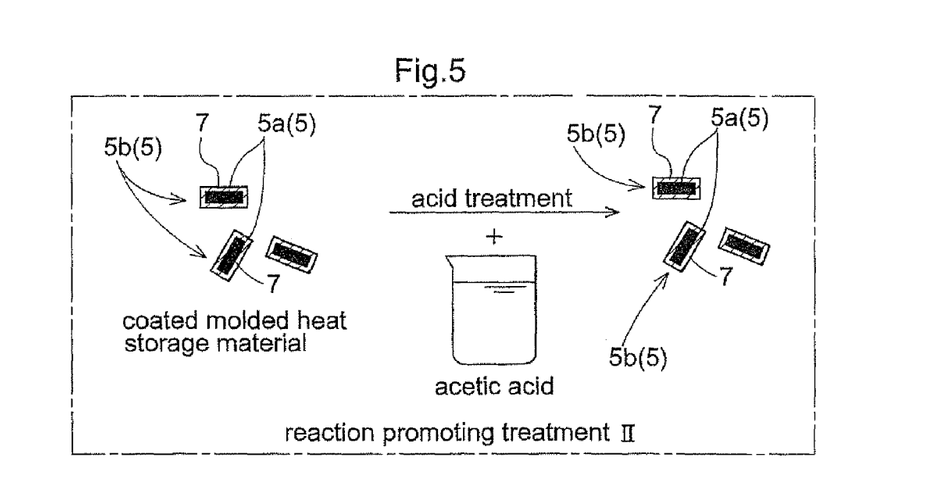
FIG. 5 is a schematic view illustrating an acid treatment in the inventive method.

FIG. 1 is a schematic view illustrating a process of manufacturing the heat storage capsules 3 and providing them as the plurality of heat storage capsules 3b in the form of powder. FIG. 2 is a schematic view illustrating the process of mixing the plurality of heat storage capsules 3b in the form of powder with the molding binder 4 and molding the resultant mixture into molded heat storage material 5a. FIG. 3 is a schematic view illustrating the process of coating (e.g. spraying) a coating binder 6 to the molded heat storage material 5a to form a coated molded heat storage material 5b having a coating layer 7 thereon. FIG. 4 is a schematic view illustrating the process of subjecting the coated molded heat storage material 5b to a heating treatment as a reaction promoting treatment. FIG. 5 is a schematic view illustrating the process of subjecting the coated molded heat storage material 5b to an acid treatment as an alternative reaction promoting treatment. FIG. 6 is a schematic view illustrating the process of mixing the coated heat storage material 5b with a granular adsorbent material 8 together with a binder 9, thereby to form a heat storage adsorbent material 10.

[Heat Storage Capsule 3]

As shown in FIG. 1, the heat storage capsule 3 comprises a microcapsule containing the phase change material 1 absorbing/discharging latent heat according to a change in temperature charged in an outer shell.

The phase change material 1 is not particularly limited as long as the material is a compound which absorbs/discharges the latent heat in accordance with a phase change. Selection of the compound can be made in accordance with a phase change occurring temperature (e.g. the melting point, the solidifying point, etc), depending on the intended use of the heat storage adsorbent material 10. For example, the compound comprises an organic or inorganic compound having a melting point from about −150° C. to 100° C., more preferably, from about 0° C. to 60° C. for its use in a canister 20 (not shown). Some non-limiting examples are: straight-chain fatty acid hydrocarbons, such as tetradecane, pentadecane, hexadecane, heptadecane, octadecane, nonadecane, eicosane, henicosane, docosane, natural wax, petroleum wax, hydrates of inorganic compounds such as $LiNO_3.3H_2O$, $Na_2SO_4.10H_2O$, $Na_2HPO_4.12H_2O$, fatty acids such as capric acid, lauric acid, high alcohols having carbon number of 12-15, ester compounds such as methyl palmitate, etc. A non-limiting example of the phase change is liquid-solid phase change.

Optionally, the phase change material 1 can use two or more kinds of the above compounds in combination. In the case of using two ore more kinds of phase change materials 1 in combination, it is preferred that the combination be such that a difference between the phase-change occurring temperatures of the respective phase change materials 1 be from 0 to 100° C. approximately or from 0 to 15° C. for use in the canister.

Further, in order to prevent undercooling phenomenon of the phase change material 1, a compound having a higher melting point than the phase change material 1 may be added, if needed.

And, with using the phase change material 1 as the core material, a microcapsule may be made by such known method as the coacervation method, the in-situ method (interfacial reaction method) to be used as the heat storage capsule 3. For instance, the phase change material 1 will be emulsified in a medium with using an emulsifier such as a surface active agent, to which a prepolymer corresponding to a desired polymer compound 2 (resin or the like) to be described later will be added. Then, the resultant mixture is heated to about 70° C. to allow a polymerization reaction to proceed. With this, there can be prepared a dispersion liquid (slurry) 3a of the heat storage capsules 3 containing the phase change material 1 charged in the outer shells (resin or the like). Then, if this heat storage capsule dispersion liquid 3a is dried at about 90° C., heat storage capsules 3 in the form of solids (a plurality of heat storage capsules 3b in the form of powder) can be prepared (see FIG. 1).

As the outer shell of the heat storage capsule 3 (microcapsule), a known polymer compound 2 can be used without any particular limitations. Some non-limiting examples thereof are formaldehyde-melamine resin, melamine resin, formaldehyde-urea resin, urea resin, urea-formaldehyde-polyacrylate copolymer, polystyrene, polyvinyl acetate, polyacrylonitrile, polyethylene, polybutylmethacrylate, gelatin, etc. Preferably, a thermoset resin, in particular, melamine resin, is used.

The mass ratio between the outer shell of the heat storage capsule 3 and the phase change material 1 (outer shell:phase change material 1) is not particularly limited. But, this normally ranges from 40:60 to 5:95, preferably from 30:70 to 10:90.

The average particle diameter of the heat storage capsule 3 can be any selected from the required heat storing amount, capsule strength. Yet, an average particle diameter from a few μm to a few tens of μm is preferred as this can ensure the desirable heat storing performance and can effectively prevent break of the heat storage capsule 3 at the same time.

[Molded Heat Storage Material 5a (Heat Storage Material 5)]

As shown in FIG. 2, the heat storage material 5 is designed to contain the heat storage capsules 3. In the case of the instant embodiment, there is employed a granular molded heat storage material 5a prepared by molding a plurality of heat storage capsules 3b in the form of powder with a molding binder 4. More particularly, the heat storage capsules 3b in the form of powder are kneaded (mixed) with a relatively small, predetermined amount of molding binder 4 (if necessary, water is also added) and granulated by a known granulating machine and then dried (e.g. about 90° C.), thus being molded into the granular molded heat storage material 5a. Therefore, as shown in the enlarged view of FIG. 2, the molded heat storage material 5a is molded in the form of a grain in which peripheries of mutually contacting portions of the plurality of heat storage capsules 3 are bound with the molding binder 4, with gaps or voids V being present in its surface and inside. With this manner of molding, it is possible to reduce the mixing amount of the molding binder having no heat storing function, thus preventing disadvantageous reduction in the heat storing amount per unit volume. Incidentally, in the SEM photograph of the molded heat storage material 5a in FIG. 8 also, it may be understood that the gaps or voids V are present in the surface and inside.

As the predetermined amount described above, from 1 to 10 mass % of the molding binder 4 can be mixed relative to the plurality of heat storage capsules 3b in the form of powder. If the amount is less than 1 mass %, this will result in deterioration in the strength of the molded heat storage material 5a. So, if this molded heat storage material 5a is destructed, there occurs reduction in the heat storing effect. Further, in the molded heat storage material 5a, more than necessary number of gaps or voids V will be formed between the heat storage capsules 3 bound with the molding binder 4, thus resulting in reduction in the density, which results, in turn, in reduction in the heat storing performance per unit volume disadvantageously. On the other hand, if the mixing amount exceeds 10 mass %, this will result in reduction in the amount of heat storage capsules relative to the amount of molding binder 4, which also results in reduction in the heat storing capacity disadvantageously. For the same reason, preferably; the predetermined amount is from 1-8 mass %, more preferably from 2-6 mass %.

As the molding binder 4, any known binder (thermoplastic resin or thermoset resin) may be employed. The material can be appropriately selected, depending on the intended use and the use condition of the heat storage adsorbent material 10. For instance, cellulose such as methylcellulose, carboxy methylcellulose, phenol resin, polyvinyl alcohol, vinyl acetate, amide ester, acrylic acid resin, SBR resin, melamine resin, epoxy resin, etc. may be employed. In particular, when this heat storage adsorbent material 10 is used in a canister 20, soaking resistance and water resistance are required. Therefore, it is needed to employ a molding binder 4 that satisfies these requirements. For example, a thermoset resin of the phenol type, acrylic type, isocyanate type, melamine type, urethane type, amide ester type, which provides the molded heat storage material 5a with a hardness of 90% or more of the JIS hardness (JIS K 1474) is preferred. Especially, phenol resin is preferred as a thermoset resin which can ensure sufficient strength by hardening through promotion of its polymerization reaction by the relatively simple treatment of heating. Further, in view of desirable improvement in the polymerization degree of the polymer compound constituting the outer shell of the heat storage capsule 3, it is preferred to employ, as the molding binder 4, a resin having a group reactive with an unreacted group of this polymer compound 2. For instance, in case the polymer compound 2 is melamine resin, it is preferred to employ methylol compound, phenol resin, isocyanate compound, epoxy compound, acrylic acid, aldehyde compound, melamine resin, epoxy resin, etc. Further, in view of the desirability of the molding binder 4 having a higher water resistance, it is possible to employ a resin having a hydrophilic group before hardening and having a hydrophobic group after hardening. For instance, phenol resin can be employed.

The shape of the granular molded heat storage material 5a is not particularly limited in the present invention. For instance, the material can be molded into any desired shape such as a pellet (cylindrical or spherical), disc, block honeycomb, etc. Further, the average particle diameter is not particularly limited in the present invention. Normally, however, the diameter ranges from 0.1 mm to 4 mm approximately. Preferably, it ranges from 0.3 mm to 3.5 mm approximately, more preferably, from 0.5 mm to 3.0 mm approximately.

[Coated Molded Heat Storage Material 5b (Heat Storage Material 5)]

As shown in FIG. 3, in the case of the present embodiment, there is employed the coated molded heat storage material 5b formed by coating the above-described molded heat storage material 5a with a coating binder 6. More particularly, with using a known coating machine, a relatively small, predetermined amount, of coating binder 6 is applied to the outer peripheral surface portion of the granular molded heat storage material 5a, thereby to form a coating layer 7 thereon, thus, the coated molded heat storage material 5b is manufactured Therefore, first, the outer contour of the molded heat storage material 5a is formed by the molding binder 4 and after this outer contour has been formed definitively, the coating layer 7 can be formed on the outer peripheral surface portion of the molded heat storage material 5a. So, even if the coating layer 7 is to be formed in such a manner as to completely cover the outer peripheral surface portion, it is still possible to keep the amount of the coating binder 6 relatively small and also the coating operation can be carried out relatively easily. Incidentally, in the SEM photograph of the coated molded heat storage material 5b of FIG. 7 too, it is understood that the coating layer 7 is formed to cover the entire outer peripheral surface portion (see in particular FIG. 7(b)). As the known coating machine, it is possible to employ a pan type coating machine wherein the molded heat storage material 5a is charged into a rotating drum and then aqueous solution with the coating binder 6 dissolved therein is sprayed onto the material while drying air is sent into the drum, thereby to coat the molded heat storage material 5a with the coating binder 6 or a fluidized tank type coating machine wherein to the molded heat storage material 5a charged into a fluidized tank, hot air is fed from the bottom of this fluidized tank, thereby to float/fluidize the material while aqueous solution with the coating binder 6 dissolved therein is sprayed to coat the molded heat storage material 5a with the coating binder 6 and then dried.

As the above described predetermined amount, from 1 to 10 mass % of the coating binder 6 may be mixed relative to the molded heat storage material 5a. If the amount is less than 1 mass %, this will result in reduction in the alcohol resistance and gasoline resistance disadvantageously. On the other hand, if the amount exceeds 10 mass %, this will result in reduction in the amount of the heat storage capsules relative to the molding binder 4 and the coating binder 6, disadvantageously. For the same reason as above, this predetermined amount should range preferably from 1 to 8 mass %, more preferably from 2 to 6 mass %. Further, the layer thickness of the coating layer 7 ranges from 0.5 to 15 μm approximately. If the thickness is below 0.5 μm, this will result in reduction in the solution resistance such as alcohol resistance. On the other hand, if the thickness exceeds 15 μm, this will result in reduction in the heat storing amount, disadvantageously. For the same reason, the thickness should range preferably from 1 to 10 μm, more preferably, from 1 to 8 μm.

As the coating binder 6, any known binder (thermoplastic resin or thermoset resin) may be employed, like the molding binder 4. The material can be appropriately selected, depending on the intended use and the use condition of the heat storage adsorbent material 10. For instance, cellulose such as methylcellulose, carboxy methylcellulose, phenol resin, polyvinyl alcohol, vinyl acetate, amide ester, melamine resin, epoxy resin, etc. may be employed. In particular, when this heat storage adsorbent material 10 is used in a canister 20, soaking resistance and water resistance are required. Therefore, it is needed to employ a coating binder 6 that satisfies these requirements. For example, a thermoset resin of the phenol type, acrylic type, isocyanate type, melamine type, urethane type, amide ester type, which provides the coated molded heat storage material 5b with a hardness of 90% or more of the JIS hardness (JIS K 1474) is preferred. Especially, phenol resin is preferred as a thermoset resin which can ensure sufficient strength by hardening through promotion of its polymerization reaction by the relatively simple treatment of heating. Further, in view of desirable improvement in the polymerization degree of the polymer compound constituting the outer shell of the heat storage capsule 3, it is preferred to employ, as the coating binder 6, a resin having a group reactive with an un-reacted group of this polymer compound 2. For instance, in case the polymer compound 2 is melamine resin, it is preferred to employ methylol compound, phenol resin, isocyanate compound, epoxy compound, acrylic acid, aldehyde compound, melamine resin, epoxy resin, etc. Further, in view of the desirability of the coating binder 6 having a higher water resistance, it is possible to employ a resin having a hydrophilic group before hardening and having a hydrophobic group after hardening. For instance, phenol resin can be employed.

In the above, prior to the formation of the coating layer 7 by coating the molded heat storage material 5a with the coating binder 6, the hydrophilic resin may be coated to form an intermediate layer (not shown). Further alternatively, a mixture prepared by mixing this hydrophilic resin with the coating binder 6 may be used for coating the outer peripheral surface portion of the molded heat storage material 5a. In particular, preferably, the hydrophilic resin has a hydrophilic group in its side chain and a hydrophobic group in its main chain. With this, when the molding binder 4 used in forming the molded heat storage material 5a is hardened to be hydrophobic, thus making it difficult to fixedly attach the coating binder 6 (e.g. containing water) to the outer peripheral surface portion of this molded heat storage material 5a, the coating binder 6 can be firmly attached to this outer peripheral surface portion of the molded heat storage material 5a relatively easily, thanks to the presence of the hydrophilic resin. Some non-limiting examples of the resin having hydrophilicity are polyvinyl alcohol, acrylic acid resin, polyamine resin.

[Reaction Promoting Treatment]

In the present embodiment, as shown in FIG. 4 and FIG. 5, a reaction promoting treatment is effected to the coated molded heat storage material 5b. This treatment will be described next.

The reaction promoting treatment is not particularly limited in the present invention as long as it can promote the polymerization reaction of at least the coating binder 6. A heating treatment and an acid treatment are preferred, however.

<Reaction Promoting Treatment I (Heating Treatment)>

As shown in FIG. 4, after the coating layer 7 is formed on the molded heat storage material 5a thereby to form the coated molded heat storage material 5b, the heating treatment is done on this coated molded heat storage material 5b.

With this, even if e.g. the polymerization degree of the coating binder 6 constituting the coating layer 7 is low, the polymerization reaction of at least this coating binder 6 is promoted, thereby to close small holes present in the coating layer 7, thus providing a denser coating layer 7. This dense coating layer 7 has an enhanced mechanical strength as well as higher soaking resistance against organic solvents, especially, gasoline with high alcohol content highly aggressive to the coating binder 6, etc. As a result, destruction of the outer shells of the heat storage capsules 3 can be avoided. Incidentally, this heating treatment can promote not only the polymerization reaction of the coating binder 6, but also polymerization reactions of the molding binder 4 and the polymer material 2 constituting the outer shell of the heat storage capsule 3, so that these too can be formed denser.

Further, though not shown, the heating treatment can be done to the coated molded heat storage material 5b contained in the heat storage adsorbent material 10 formed by integrally molding, with a binder 9 the coated molded heat storage material 5b and a granular adsorbent material 8 to be described later.

The heating treatment can be carried out in a temperature range from 140° C. to 185° C., more preferably, from 150° C. to 180° C. Here, the reason why the heating temperature should be 140° C. or higher is to sufficiently promote further polymerization reaction of the coating binder 6, thus eliminating un-hardened portions. On the other hand, the reason why the heating temperature should be 185° C. or lower is to restrict thermal decomposition of the heat storage capsule 3 through destruction of the outer shell when the inner pressure is increased due to expansion of the phase change material 1 charged in the heat storage capsule 3. For the same reason, more preferably, the heating temperature should range from 150° C. to 180° C.

<Reaction Promoting Treatment II (Acid Treatment)>

As shown in FIG. 5, the acid treatment is not particularly limited as long as this can promote the polymerization reaction of the molding binder 4 and the coating binder 6, thereby to enhance the polymerization degree. For instance, the coated molded heat storage material 5b formed with the coating layer 7 may be subjected to immersion in an acid-containing solution, spraying of an acid-containing solution, mixing of an acid in a binder 9 in the course of forming the heat storage adsorbent material 10 by mixing the coated molded heat storage material 5b and the granular adsorbent material 8.

In particular, if the acid treatment is effected prior to effecting the above-described heating treatment, this results in shifting of the above-shown temperature range (from 140° C. to 185° C.) suitable for the heating treatment toward the lower temperature side by a predetermined width, so that the molding binder 4 and/or the coating binder 6 (in particular, the coating layer 7) can be formed even denser at the lower temperature.

Some non-limiting examples of acid usable in the acid treatment are acetic acid, formic acid, propionic acid, oxalic acid, phthalic acid, citric acid, phosphoric acid, p-toluenesulfonic acid, benzenesulfonic acid, hydrochloric acid, sulfuric acid, nitric acid, etc.

[Adsorbent Material 8]

As the adsorbent material 8, any known adsorbent material can be used which can adsorb a gas or the like. In the case of its use in the canister 20, in particular, a known adsorbent material capable of adsorbing an evaporable fuel such as gasoline can be used. For instance, activated carbon, zeolite, silica gel, organometallic complex (copper fumarate, copper terephthalate, copper cyclohexanedicarboxylate, etc.) or a mixture thereof can be used.

Non-limiting examples of the gas or the like as the adsorption target of the adsorbent material 8 include methane, gas containing methane, as its principal component (natural gas, digestion gas, etc.), ethane, propane, dimethyl ether, $CO_2$, hydrogen sulfide, oxygen, nitrogen, $NO_x$, $SO_x$, CO, acethylene, ethylene, ammonia, methanol, ethanol, water, chloroform, aldehyde, etc. In case the adsorbent material 8 is charged within the case 21 of the canister 20, the adsorption target is gasoline as an evaporable fuel, in particular, a mixture of alcohol (ethanol or the like) and gasoline.

The adsorbent material 8 can be prepared by pulverizing activated carbon or the like or such pulverized material can be mixed with a binder and granulated in the granular adsorbent material 8. As this binder, the molding binder 4 can be used, like the case of the molded heat storage material 5a. Incidentally, the size and the shape of the granular adsorbent material 8 can be same as or similar to those of the molded heat storage material 5a.

[Heat Storage Adsorbent Material 10]

The heat storage adsorbent material 10 is prepared by mixing the heat storage material 5 and the adsorbent material 8. The mixing method is not particularly limited in the present invention. For instance, this can be done simply by mixing uniformly the coated molded heat storage material 5b with the granular adsorbent material 8. Or, as shown in FIG. 6, after the coated molded heat storage material 5b is mixed with the granular adsorbent material 8, the resultant mixture is integrated with a binder 9 and molded into the heat storage adsorbent material 10. As this binder 9, the molding binder 4 can be used. The shape of this molded heat storage adsorbent material 10 is not particularly limited in the present invention. For instance, the material can be molded into any desired shape, such as a pellet (cylindrical, spherical), disc, block, honeycomb, etc. The average particle diameter thereof is not particularly limited, either. Normally, for use in the canister 20, the diameter ranges from 0.5 mm to 4 mm approximately, preferably, from 0.5 to 3.6 mm approximately, more preferably from 1 mm to 3 mm approximately.

EXAMPLES

Next, the inventive method will be explained specifically, with reference to some examples.

Example 1

To 5 g of melamine powder, 6.5 g of 37% formaldehyde water solution and 10 g of water were added to be adjusted to pH 8. The resultant mixture was heated to about 70° C., whereby melamine-formaldehyde initial mixture (prepolymer) water solution was obtained. To 100 g of sodium salt water solution of styrene-maleic anhydride copolymer adjusted to pH 4.5, a mixture liquid containing 58 g of hexadecane as a phase change material 1 dissolved therein was added under vigorous stirring and emulsification was allowed to proceed until the particle diameter became 7 μm approximately. To this emulsified water solution, the entire amount of the above-described melamine-formaldehyde initial mixture water solution was added and stirred at 70° C. for 2 hours and then adjusted to pH9 for capsulation. By this capsulation process, there was obtained dispersion 3a of heat storage capsules 3 containing hexadecane as the phase change material 1 within outer shells formed of the melamine resin. After completion of the reaction, the heat storage capsules 3 were spray-dried, whereby a plurality of heat storage capsules 3b in the form of powder having a particle diameter of about 7 μm were obtained.

To the plurality of heat storage capsules 3b in the form of powder, 4 mass % of phenol resin was added as a molding binder 4. And, the resultant mixture was processed through an extrusion molding machine into molded heat storage material 5a in the form of pellets with 2 mm diameter. After this molded heat storage material 5a was dried, the material was coated with 3 mass % of phenol resin as a coating binder 6, dissolved in a mixture solution of water and ethanol, whereby a coated molded heat storage material 5b was formed. Thereafter, this coated molded heat storage material 5b was subjected to a heating treatment at 160° C. for 2 hours.

Example 2

In this example, instead of the phenol resin as the coating binder 6 dissolved in the mixture solution of water and ethanol, to the phenol resin (3 mass %) dissolved in water, water solution of polyvinyl alcohol (0.2 mass %) which is a hydrophilic resin, was added. Except this difference, by the same process as Example 1 described above, a coated molded heat storage material 5b was obtained. Thereafter, this coated molded heat storage material 5b was subjected to a heating treatment at 160° C. for 2 hours.

Example 3

In this example, instead of the phenol resin as the coating binder 6, 3 mass % of epoxy resin (consisting of a main agent, and a hardening agent) was coated. Except this difference, by the same process as Example 1 described above, a coated molded heat storage material 5b was obtained. Thereafter, this coated molded heat storage material 5b was subjected to a heating treatment at 160° C. for 2 hours.

Example 4

The coated molded heat storage material 5b formed with coating of the phenol resin as the coating binder 6 was immersed in 30 mass % of acetic acid water solution and then heated at 130° C. Except this difference, by the same process as Example 1 described above, a coated molded heat storage material 5b was obtained.

Comparison Example 1

In this example, the molded heat storage material was not coated with the coating binder. Except this difference, by the same process as Example 1 described above, a molded heat storage material was obtained. Thereafter, this molded heat storage material was subjected to a heating treatment at 160° C. for 2 hours.

Comparison Example 2

In this example, the coated molded heat storage material was subjected to a heating treatment at 130° C. Except this difference, by the same process as Example 1 described above, a coated molded heat storage material was obtained.

Comparison Example 3

In this example, the coated molded heat storage material was subjected to a heating treatment at 190° C. Except this difference, by the same process as Example 1 described above, a coated molded heat storage material was obtained.

For the coated molded heat storage materials 5b relating to Examples 1, 2, 3, 4 obtained by the method described above and the molded heat storage materials relating to Comparison Examples, 1, 2, 3, soaking resistances against a mixture solution 50 mass % of ethanol and 50 mass % of gasoline were investigated. More particularly, after each molded heat storage material was immersed at 70° C. for 24 hours in a mixture solution of 50 mass % ethanol and 50 mass % gasoline, the molded heat storage material was taken out and washed with hexane and then vacuum-dried at 100° C. Then, the amount of heat of each resultant molded heat storage material was determined with using a differential calorimeter. The result are shown in Table 1 below.

TABLE 1

|  | heat amount before immersion (J/g) | heat amount after immersion (J/g) |
| --- | --- | --- |
| Example 1 | 196 | 190 |
| Example 2 | 194 | 193 |
| Example 3 | 195 | 195 |
| Example 4 | 196 | 148 |
| Comparison Example 1 | 201 | 0 |
| Comparison Example 2 | 196 | 12 |
| Comparison Example 3 | 195 | 68 |

Figure 7:
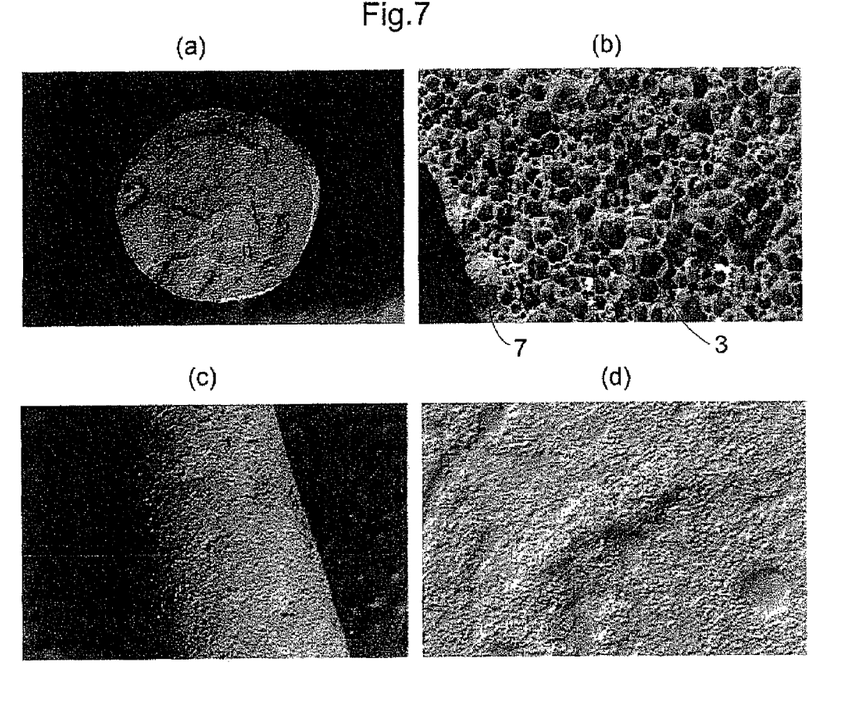

From the above results, like Examples 1, 2, 3 and 4, it is understood that if the molded heat storage material 5a is coated with the phenol resin to form the coating layer 7 thereon and then the resultant material is subjected to a heating treatment at least in a predetermined temperature range or an acid treatment, the soaking resistance is enhanced clearly. This is probably because, as shown in FIG. 7, the phenol resin as the coating binder 6 is applied uniformly and entirely on the outer peripheral surface portion of the molded heat storage material 5a in the form of pellet, thus forming the coating layer 7 and also this coating layer 7 is formed dense by e.g. the heating treatment, so that the outer shell of the heat storage capsule 3 is not directly exposed to the gasoline or ethanol, thus providing the high soaking resistance. FIG. 7(*a*) is an SEM photograph (×30) of the section of the coated molded heat storage material 5b according to Example 1. FIG. 7(*b*) is an SEM photograph (×1000) of the same section. FIG. 7(*c*) is an SEM photograph (×30) of the surface of the coated molded heat storage material 5b according to Example 1. FIG. 7(*d*) is an SEM photograph (×1000) of the same surface as (*c*). It may be understood from FIG. 7(*b*), that the coating layer 7 is formed with the thickness of about 6 μm.

On the other hand, in the case of Comparison Example 1 having no coating layer 7 and Comparison Examples 2 and 3 with the heating temperature ranges being inappropriate, due to the presence of relatively high concentrations of ethanol aggressive to the heat storage capsules 3, the outer shell and/or the coating layer of the heat storage capsule 3 was destroyed, so that the heat storing ability has deteriorated significantly. For instance, as shown in FIG. 2 and FIG. 8, in the case of the molded heat storage material (corresponding to the "molded heat storage material 5a" of the present invention) according to Comparison Example 1, the molding binder 4 does not cover entirely the heat storage capsule 3, but binds the periphery of the mutually contacting portions of the plurality of heat storage capsules 3 (the mutually contacting portions between the heat storage capsules 3), thus forming the molded heat storage material, so that gaps or voids V are present in its surface and inside. So, when gasoline, ethanol or the like enters these gaps or voids V, there occurs direct contact of the outer shells of the heat storage capsules 3 to the gasoline or ethanol, so the outer shells, etc. can be easily destroyed, thus resulting in reduction in the heat storing ability.

In this way, it has been confirmed that the coated molded heat storage material 5b manufactured by the method of manufacturing a heat storage material according to the present invention has high soaking resistance even in gasoline containing alcohol such as ethanol at a high concentration.

[About Amount of Coating Binder in Example 1]

The coated molded heat storage material 5b manufactured by the method of manufacturing a heat storage material according to the present invention is formed by coating with a relatively small amount of coating binder 6. For instance, in the case of Example 1 described above, 3 mass % of phenol resin was applied to the molded heat storage material 5a, to form the coating layer 7 in the thickness of about 6 μm. This is made possible probably because the forming is done after the periphery of the mutually contacting portions of the plurality of heat storage capsules 3 with the molding binder 4 (the mixing amount of the molding binder 4 relative to the heat storage capsules 3 is 4 mass %), the coating is possible with such relatively small amount of coating binder 6.

On the other hand, if each single heat storage capsule 3 is to be formed with a coating layer of substantially same thickness as the coating layer 7 (e.g. 6 μm), this will require a significant amount of coating binder. So, such increase in the mixing amount of the coating binder having no heat storing ability results in significant reduction in the heat storing ability per unit volume. According to specific calculation, if coating with the coating binder is to be done in the thickness of 6 μm in on a heat storage capsule having the diameter of 7 μm, the volume of the coating layer thus coated will be about 5.4 times the volume of the heat storage capsule 3 and the weight of the coating layer will be 7.7 times the weight of the heat storage capsule 3. Therefore, the heat amount of one heat storage capsule 3 will be reduced by 89% relative to the heat storage capsule 3 of Example 1. Incidentally, this calculation was done, with the assumptions of the particle diameter of the heat storage capsule 3 being 7 μm, the ratio between the phase change material 1 and the polymer compound (melamine resin) forming the outer shell of the heat storage capsule 3 being 90 mass %:10 mass %, the density of the phase change material 1 being 0.77 g/ml, the density of the polymer compound (melamine resin) forming the outer shell of the heat storage capsule 3 being 1.16 g/ml.

Therefore, as described above, like Example 1, it may be understood that if after the formation of the molded heat storage material 5a containing the heat storage capsules 3 with the molding binder 4 and then the outer peripheral surface portion of this molded heat storage material 5a is coated with the coating binder 6 to form the coating layer 6, it is possible to minimize the amounts of the molding binder 4 and the coating binder 6 which have no heat storing ability, so that reduction in the heat storing performance per unit volume can be prevented reliably.

Other Embodiments (1) In the foregoing embodiment, as shown in FIG. 3, FIG. 4 and FIG. 5, after the coating layer 7 is formed on the molded heat storage material 5a to form the coated molded heat storage material 5b, this coated molded heat storage material 5b is subjected to a reaction promoting treatment. With this, even when the polymerization degree of the coating binder 6 constituting the coating layer 7 is low, the polymerization reaction of at least this coating binder 6 is promoted to close minor holes present in the coating layer 7, thus forming this coating layer 7 denser.

However, after the manufacture of the coated molded heat storage material 5b having the coating layer 7 and prior to effecting the reaction promoting treatment, an overcoating layer may be formed with an overcoating resin on the outer peripheral surface portion of the coated molded heat storage material 5b. With this, for instance, when the heating treatment is to be effected as the reaction promoting treatment, the coating binder 6 coating the outer surface portion of the coated molded heat storage material 5b may bind with the coating binder 6 coating the outer surface portion of another coated molded heat storage material 5b, so that these coated molded heat storage materials 5b being bound to each other or peeling occurs in such bound portion, thus removing the coating binder 6, thereby to reduce the heat storing performance. The above construction can effectively prevent this.

More particularly, on the coated molded heat storage material 5b on which the coating layer 7 has been formed and which is before being subjected to the reaction promoting treatment, an overcoating layer is formed on the outer surface portion of this coated molded heat storage material 5b, with using a predetermined amount of overcoating resin.

As the overcoating resin, any resin having a lower hardening temperature than the hardening temperature of the coating binder 6 (e.g. thermoset resin, thermoplastic resin) can be used without any limitations. Some non-limiting examples thereof include polyacrylate resin (thermoplastic resin) such as polyacrylic acid, polyacrylic methyl, polymethacrylic acid, polymethylmethacrylate, acryl-styrene copolymer, acryl-vinyl acetate copolymer, cellulose resin such as methylcellulose, carboxy methylcellulose, acetylcellulose, styrene butadiene (SBR) resin, polyvinyl alcohol, vinyl acetate, ethylene vinyl alcohol, etc. The hardening temperature of this overcoating rein is set lower than the hardening temperature of the coating binder 6. Depending on the kind of the coating binder 6, it can be a temperature of 100° C. or lower, preferably 80° C. or lower, more preferably 60° C. or lower. The overcoating resin is designed to maintain its hardened condition even at the temperature used at the time of the heating treatment (from 140° C. to 185° C.). For example, in case the coating binder 6 employs a phenol resin (having the hardening temperature of about 150° C.), it is preferred that a polyacrylic resin having a hardening temperature of 100° C. or lower (product names: EK-61, EK-32, EK-14, EK-11-5 from Saiden Chemical Industry, Co., Ltd.) be used as the overcoating resin. Further, as the predetermined amount, from 0.2 to 3 mass % of overcoating resin can be mixed in the coated molded heat storage material 5b. If the amount is less than 0.2 mass %, there is the possibility of mutual binding of the coating binder 6 (mutual binding between the coated molded heat storage materials 5b) disadvantageously. On the other hand, if the amount exceeds 3 mass %, this results in disadvantageous reduction in the amount of the heat storage capsules contained in the coated molded heat storage material 5b. Incidentally, for the same reason as above, preferably, this predetermined amount should range from 0.3 to 2 mass %, more particularly, from 0.5 to 1.5 mass %. The thickness of the overcoating layer formed as above ranges from 0.1 to 3 μm.

With the forming of the overcoating layer in the manner described above, in case the heating is done to the temperature of the heating treatment as the reaction promoting treatment for promoting polymerization of e.g. the coating binder 6 (eventually promoting its hardening), even if the coating binder 6 has not yet been hardened, as the hardening occurs first in resin for the overcoating, it is possible to effectively prevent mutual binding between the coated molded heat storage materials 5b in the course of heating up to the heating treatment or during the heating treatment.

Example 5

Coated molded heat storage material 5b was obtained in the same manner as Example 1 described above. Then, this coated molded heat storage material 5b was subjected to coating by the pan type coating machine with a predetermined amount of polyacrylic resin (product name: EK-61 from Saiden Chemical Industry Co., Ltd.) with continuously feeding hot air at 60° C. thereto, thereby to form an overcoating layer thereon. Then, with the hot air of 100° C., the polyacrylic resin was hardened until the temperature of the coated molded heat storage material 5b formed with the overcoating layer became 85° C. Thereafter, the material was kept still in a shelf type drying machine and then subjected to a heating treatment at 160° C. for 3 hours.

Then, mutual adherence or binding between the coated molded heat storage materials 5b after the heating treatment was evaluated. According to the results of this evaluation, in the case of 1.0 mass % or 0.5 mass % of the polyacrylic resin being added to the coated molded heat storage materials 5b, no mutual adherence at all was observed between the coated molded heat storage materials 5b. Little adherence was observed in the case of addition of 0.3 mass %. In the case of addition of 0.2 mass % and 0.1 mass %, certain amount of mutual adherence between the coated molded heat storage materials 5b was observed.

Incidentally, for the coated molded heat storage material 5b relating to Example 5 obtained by the method described above, its soaking resistance against mixture solution of 50 mass % ethanol and 50 mass % gasoline was investigated. Specifically, after each molded heat storage material was immersed in the mixture solution of 50 mass % ethanol and 50 mass % gasoline at 70° C. for 24 hours, the molded heat storage material was taken out and washed with hexane and then vacuum-dried at 100° C. Then, the amount of heat of each resultant molded heat storage material was determined with using a differential calorimeter. The result showed that the heat amount before the immersion was 195 (J/g) and the heat amount after the immersion was 195 (J/g).

(2) In the foregoing embodiment, the use of the coated molded heat storage material 5b manufactured by the inventive method was not particularly limited. Yet, a heat storage adsorbent material 10 prepared by mixing this coated molded heat storage material 5b and granular adsorbent material 8 may be used also in a canister 20 (not show) in particular.

Here, the "canister 20" is for use in preventing discharge of an evaporable fuel (organic solvent) such as gasoline supplied to an internal combustion engine of a vehicle or the like, to the outside (to the atmosphere, etc.). More particularly, during e.g. stop of the vehicle, excess evaporable fuel is adsorbed to the adsorbent material within a case 21, whereas during run of the vehicle for instance, ambient air is introduced as a purge gas into the case 21, whereby the adsorbed evaporable fuel is desorbed and supplied to the internal combustion engine again.

For such canister 20, the heat storage adsorbent material contained within the case 21 of this canister 20 comes into contact not only with the evaporable fuel such as gasoline, but also with moisture contained in the atmosphere or the like. Therefore, soaking resistance against such evaporable fuel and water resistance are required.

Therefore, if the heat storage adsorbent material 10 containing the coated molded heat storage material 5b having the superior soaking resistance and water resistance described hereinbefore in the foregoing embodiment is used as being charged within the case 21 of the canister 20, there can be obtained a canister 20 which can prevent deterioration in the adsorption/desorption performance for an extended period of time.

Incidentally, the canister 20 includes, in its case 21, a communication passage for communicating the evaporable fuel such as gasoline and a wall provided at one end of this communication passage defines an inlet for introducing the evaporable fuel and an outlet for discharging the evaporable fuel and a wall provided at the other end of the communication passage defines an ambient air inlet for introducing ambient air.

With this canister 20 in operation, during the stop of the vehicle, for instance, the evaporable fuel introduced through the inlet from the fuel tank is adsorbed to the heat storage adsorbent material 10 charged within the communication passage inside the case 21. During the vehicle run, this adsorbed evaporable fuel is desorbed by the ambient air introduced through the ambient air inlet and this evaporable fuel is supplied back through the outlet to the inner combustion engine to be combusted therein. In this way, adsorption and desorption of the evaporable fuel are effected.

The inventive method of manufacturing a heat storage material can be effectively utilized as a technique by which heat storing performance of heat storage material containing heat storage capsules does not deteriorate even under a condition where an organic solvent (in particular, evaporable fuel comprised of e.g. mixture of alcohol and gasoline) and moisture or water is present, so that the material can maintain favorable adsorption/desorption performance.

The invention claimed is:

1. A method of manufacturing a heat storage material containing heat storage capsules comprising a phase change material that at least one of absorbs latent heat or discharges latent heat in accordance with change in temperature, the phase change material being charged in outer shells of the heat storage capsules, the method comprising the steps of:
    binding a periphery of mutually contacting portions of a plurality of heat storage capsules with a molding binder, thereby to mold a granular molded heat storage material;
    coating an outer peripheral surface portion of the granular molded heat storage material with a coating binder to form a coated granular molded heat storage material having a coating layer; and
    subjecting the coated granular molded heat storage material to a reaction promoting treatment for promoting a polymerization reaction of at least the coating binder in the coating layer, thereby forming said heat storage material.

2. The method of manufacturing the heat storage material according to claim 1, wherein forming the coated granular molded heat storage material comprises drying a mixture comprising a solution of the molding binder dissolved in a solvent and the plurality of heat storage capsules.

3. The method of manufacturing the heat storage material according to claim 1, wherein said granular molded heat storage material is formed by mixing 1 to 10 mass % of said molding binder based on mass of the plurality of heat storage capsules.

4. The method of manufacturing the heat storage material according to claim 1, wherein said coating layer is formed by applying 1-10 mass % of the coating binder relative to mass of the granular molded heat storage material.

5. The method of manufacturing the heat storage material according to claim 1, wherein said reaction promoting treatment is a heating treatment comprising heating the coated granular molded heat storage material.

6. The method of manufacturing the heat storage material according to claim 5, wherein said heating treatment comprises a heating temperature range from 140° C. to 185° C., said heating temperature range, promoting the polymerization reaction of at least the coating binder in the coating layer, and being free of destroying the heat storage capsules by heating.

7. The method of manufacturing the heat storage material according to claim 1, wherein said reaction promoting treatment comprises applying an acid treatment on the coated granular molded heat storage material.

8. The method of manufacturing the heat storage material according to claim 1, wherein said molding binder and said coating binder each comprise a thermoset resin.

9. The method of manufacturing the heat storage material according to claim 1, wherein said molding binder and said coating binder each comprise a resin having a group reactive with an un-reacted group of a polymer compound constituting the outer shell.

10. The method of manufacturing the heat storage material according to claim 1, wherein said molding binder and said coating binder each comprise a resin which has both a hydrophobic group and a hydrophilic group.

11. The method of manufacturing the heat storage material according to claim 1, wherein prior to the formation of the coating layer, one of:
   a hydrophilic resin is coated on the outer peripheral surface portion of the granular molded heat storage material, thereby forming an intermediate layer thereon;
   or in the course of formation of the coating layer, a hydrophilic resin is added to said coating binder to form said coating layer.

12. The method of manufacturing the heat storage material according to claim 1, wherein after formation of the coating layer, an outer peripheral surface portion of the coating layer of the coated granular molded heat storage material prior to the reaction promoting treatment is coated with an overcoating resin having a lower hardening temperature than a hardening temperature of the coating binder of the coating layer, thereby forming an overcoating layer on said coating layer.

13. The method of manufacturing the heat storage material according to claim 12, wherein said coating binder comprises a phenol resin and said overcoating resin comprises a resin which is hardened at a temperature of 100° C. or lower.

14. The method of manufacturing the heat storage material according to claim 13, wherein said overcoating resin comprises a polyacrylic resin.

15. A heat storage material manufactured by the method according to claim 1, wherein:
   at least one of the molding binder and the coating binder comprises a resin selected from the group consisting of a phenol resin or an epoxy resin; and
   said heat storage material has at least resistance against alcohol.

16. A heat storage adsorbent material comprising a mixture of the heat storage material according to claim 15, and an adsorbent material.

17. A canister comprising a case, wherein said case of said canister comprises the heat storage adsorbent material according to claim 16.

* * * * *

UNITED STATES PATENT AND TRADEMARK OFFICE
CERTIFICATE OF CORRECTION

PATENT NO. : 8,323,450 B2
APPLICATION NO. : 12/516223
DATED : December 4, 2012
INVENTOR(S) : Kenji Seki It is certified that error appears in the above-identified patent and that said Letters Patent is hereby corrected as shown below:

Title Page; Column 1, Item (54) and Column 1, Line 3, Title, after "MATERIAL" delete "AND"

Signed and Sealed this
Twelfth Day of February, 2013

Teresa Stanek Rea
*Acting Director of the United States Patent and Trademark Office*